United States Patent [19]
Masel et al.

[11] 4,258,699
[45] Mar. 31, 1981

[54] SOLAR COLLECTORS

[75] Inventors: Ruben Masel, Kiron; George Valdshtein, Holon, both of Israel

[73] Assignee: Koor Metals Ltd., Industrial Zone, Israel

[21] Appl. No.: 965,061

[22] Filed: Nov. 30, 1978

[30] Foreign Application Priority Data

Dec. 13, 1977 [IL] Israel .................. 53591
Sep. 1, 1978 [IL] Israel .................. 55478

[51] Int. Cl.³ .................................. F26V 3/02
[52] U.S. Cl. ........................... 126/432; 126/444
[58] Field of Search ............. 126/432, 444, 900

[56] References Cited

U.S. PATENT DOCUMENTS

| | | | |
|---|---|---|---|
| 3,146,774 | 9/1964 | Yellott | 126/432 |
| 3,561,425 | 2/1971 | Gardner | 126/432 |
| 3,943,911 | 3/1976 | Yu | 126/432 |
| 4,047,518 | 9/1977 | Anderson | 126/432 |
| 4,129,117 | 12/1978 | Harvey | 126/432 |

*Primary Examiner*—Herbert F. Ross
*Attorney, Agent, or Firm*—Benjamin J. Barish

[57] ABSTRACT

A solar collector is described including a backing plate to be disposed at an incline, and a darkened heat-absorbing pliable film loosely lying over the backing plate in direct contact with it, the side edges of the film being unsecured for free and unrestrained movement on the backing plate. The solar collector further includes an inlet for introducing a light mineral oil between the backing plate and the darkened heat-absorbing film such that the light mineral oil flows downwardly by gravity in the form of a thin uniform coating between the film and the backing plate.

9 Claims, 15 Drawing Figures

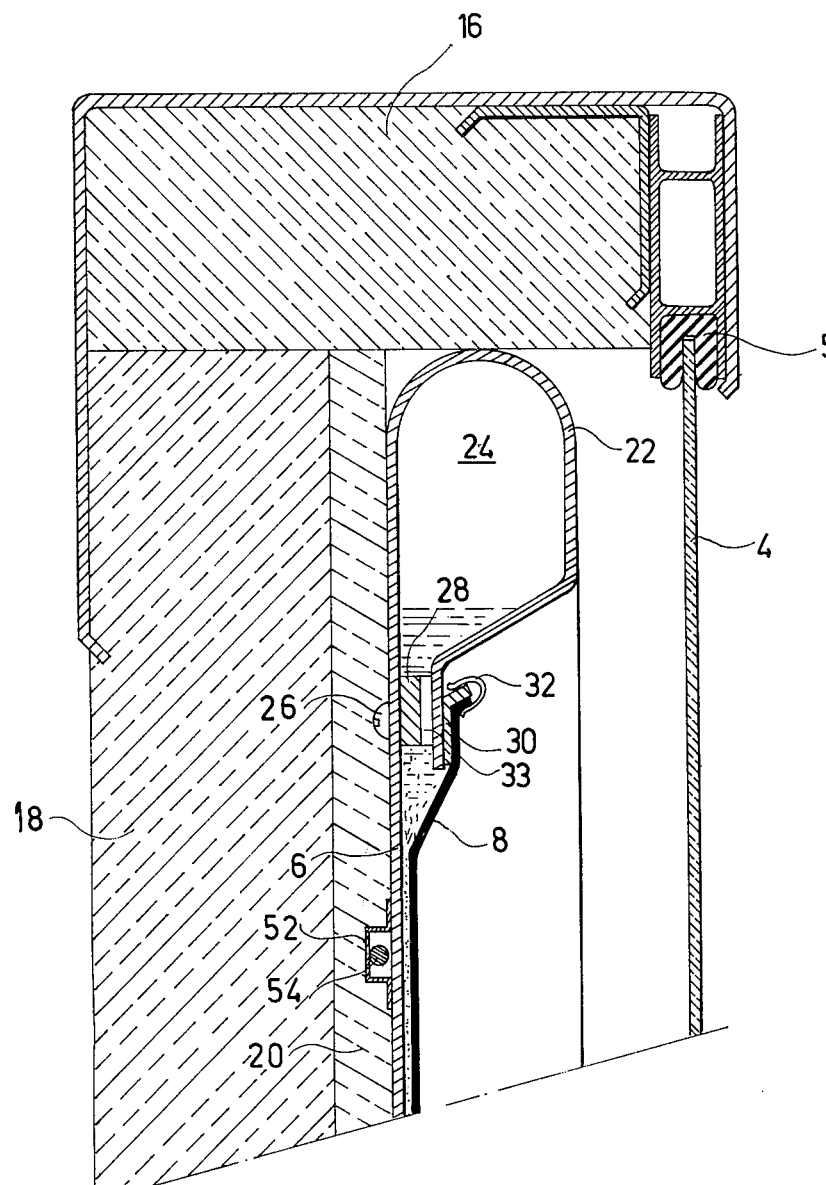
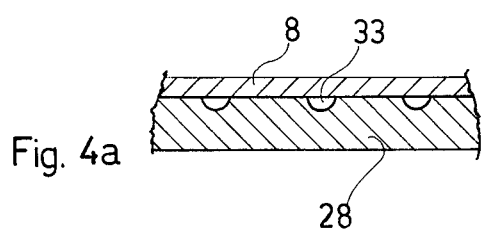
Fig. 4
Fig. 4a

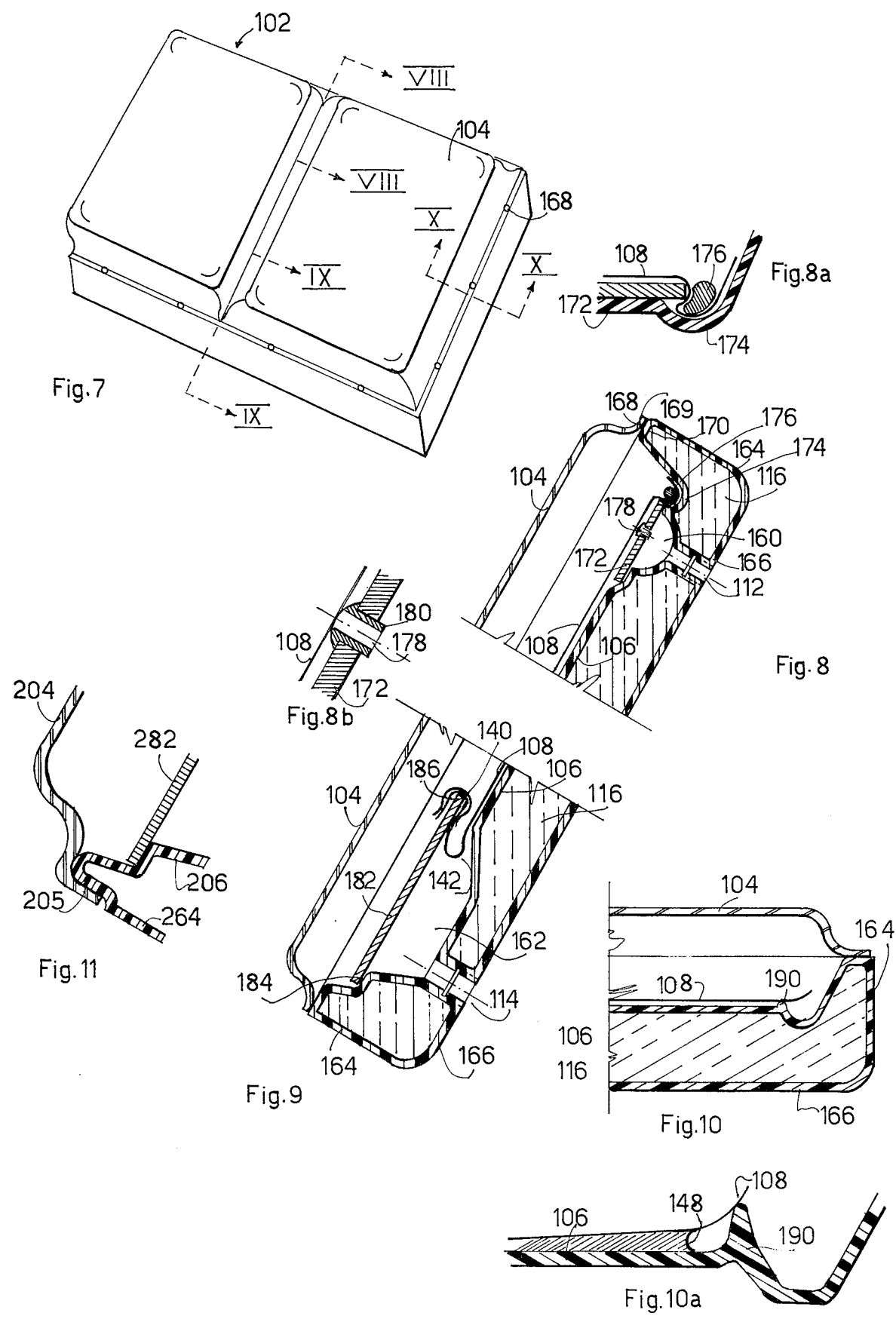

SOLAR COLLECTORS

BACKGROUND OF THE INVENTION

The present invention relates to solar collectors and particularly to those including an absorber of solar radiations for heating a heat-exchange liquid.

The known form of solar collector to which the present invention is most related includes a housing containing a darkened heat-absorbing backing plate disposed at an incline with respect to the source of solar radiations, and a pliable transparent plastic film overlying the backing plate. Water is introduced at the top of the backing plate between it and the transparent plastic film and flows downwardly by gravity in the form of a thin uniform layer, the solar radiations passing through the transparent film and the water layer and being absorbed by the darkened backing plate. Such solar collectors are primarily intended for applications wherein a relatively large volume of water is to be heated to a small temperature rise, e.g. for heating swimming pools, cisterns, tanks and the like. An example of such a solar heater is described in U.S. Pat. No. 3,146,774.

SUMMARY OF THE INVENTION

The present invention is directed particularly to the latter type of solar collector but provides a number of important improvements as discussed more fully below.

According to a broad aspect of the present invention there is provided a solar collector including a housing containing an inlet, an outlet, a backing plate to be disposed during use at an incline with respect to a source of solar radiations, and a film secured at one edge, constituting its top edge during use, to freely overlie said backing plate, said inlet being at one end, constituting the top end during use, of the housing for inletting a heat-exchange liquid between the backing plate and the overlying film such that during use the heat-exchange liquid flows downwardly by gravity in the form of a thin uniform layer between the film and the backing plate; characterized in that said film is a darkened heat-absorbing pliable film having heat heat-absorption and low heat-resistivity properties, and that it lies loosely over the backing plate in direct contact therewith with the side edges of the film unsecured for free and unrestrained movement on the backing plate.

Preferably, the backing plate is substantially planar and includes a projection extending uniformly along each side edge thereof projecting from the plane of the backing plate in the direction of the overlying darkened heat-absorbing film, the side edges of said film loosely resting on said projections so as to be flexed thereby away from the plane of the backing plate, thereby permitting the free and unrestrained sidewise movement of said film side edges and at the same time producing a meniscus in the heat-exchange liquid flowing along the side edges between said darkened heat-absorbing film and said backing plate effectively sealing said side edges against leakage of the liquid and entrance of air.

Making the overlying pliable film of a darkened heat-absorbing material results in a significantly lower proportion of the solar radiations being reflected away from the collector, and therefore in a significantly higher proportion of the solar radiations being absorbed by the heat-exchange liquid. It also substantially lowers the thermal resistivity of the film, which further increases the proportion of solar radiations absorbed by the heat-exchange liquid. Further, since the pliable film is opaque, rather than transparent as in the previous devices of this type, it is not necessary that the heat-exchange liquid flowing as a thin layer between it and the backing plate be transparent, or be water; the novel arrangement thus permits the use of other liquids selected to have the optimum combination of properties for the particular application.

Thus, the preferred-heat-exchange liquid is not water but rather is a mineral oil having good wetting properties and a flash point substantially higher than that of water. This use of oil, instead of water, substantially eliminates the formation of bubbles in the flowing liquid film (which reduce the active surface and increase the heat-transfer resistivity), and also substantially eliminates the condensation of the liquid on the outer face of the usually-provided transparent panel (which also reduces the active surface of the collector). Further, the good wetting properties of the oil ensures a uniform distribution over the backing plate; moreover, it is non-corrosive with respect to the darkened heat-absorbing film as well as to the backing plate, as compared to water used in the previously described collectors of this type, and therefore the useful life of the collector is significantly extended and its high efficiency is longer maintained.

The invention is herein described, by way of example only, with reference to the accompanying drawings, wherein:

BRIEF DESCRIPTION OF THE DRAWINGS

FIG. 4 is an enlarged fragmentary view of the upper end of the solar collector,

FIG. 4a being an enlarged detail of FIG. 4;

FIG. 7 illustrates another form of solar collector constructed in accordance with the invention;

FIGS. 8, 9 and 10 are enlarged sectional views along lines VIII—VIII, IX—IX and X—X, respectively, of FIG. 7;

FIGS. 8a and 8b are enlarged fragmentary views of portions of the construction illustrated in FIG. 8;

FIG. 10a is an enlarged fragmentary view of a portion of the construction illustrated in FIG. 10; and FIG. 11 is an enlarged fragmentary view illustrating a modification of the portion of the construction illustrated in FIG. 9.

DESCRIPTION OF PREFERRED EMBODIMENTS

Figure 1:
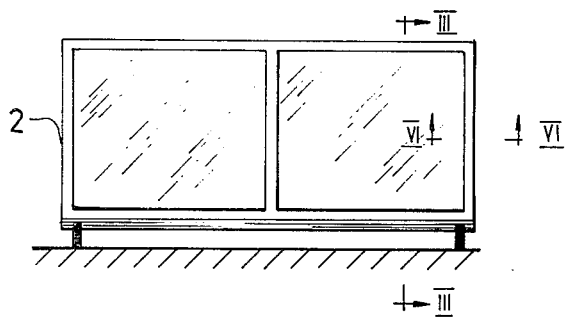
FIGS. 1 and 2 are front and side elevational views, respectively, of one form of solar collector constructed in accordance with the invention.
Figure 2:
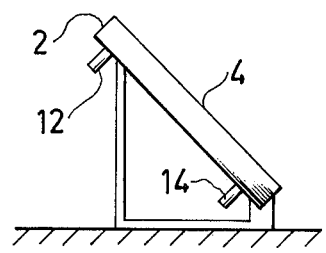
Figure 3:
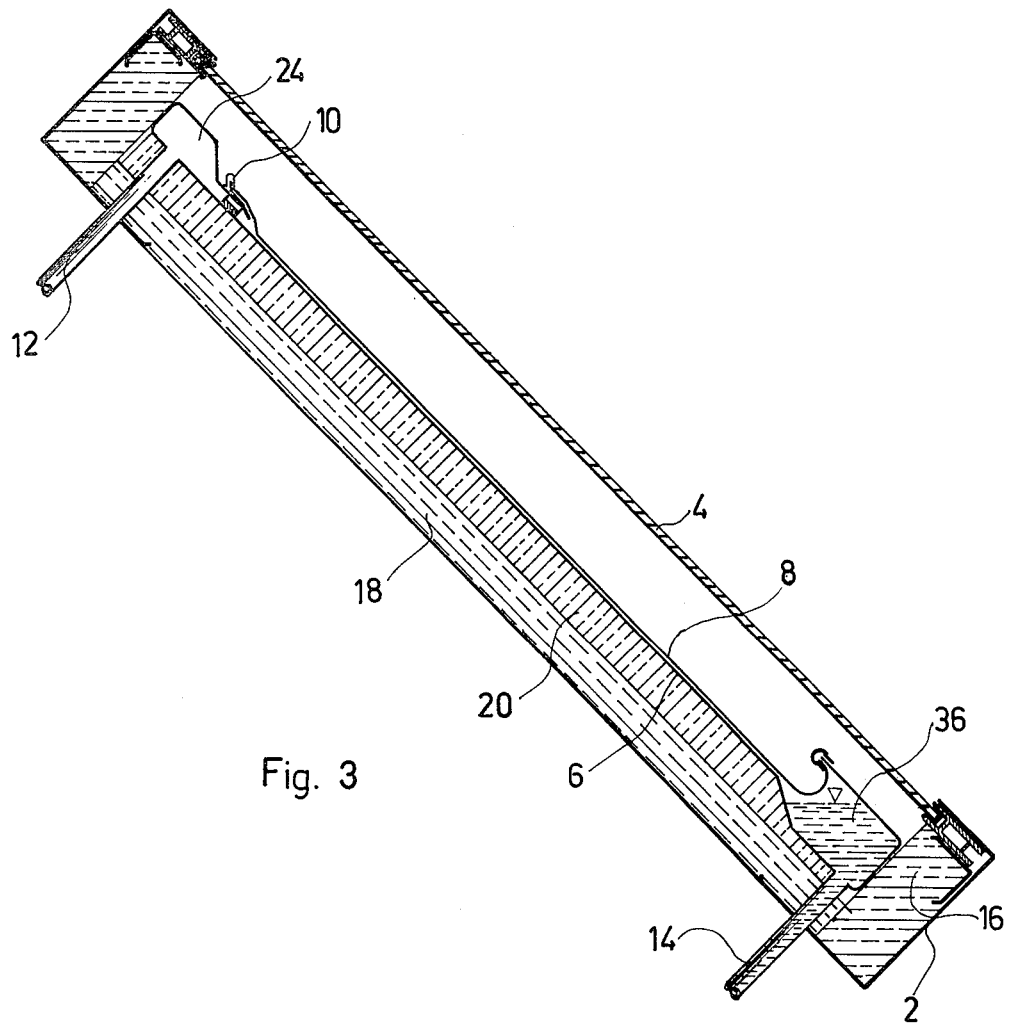
FIG. 3 is an enlarged transverse sectional view along lines III—III of FIG. 1.

The solar collector illustrated in FIGS. 1–6 is of the flat plate type including a rectangular housing adapted, during use, to be disposed at an incline with respect to the source of solar radiations. It includes a housing 2 closed by a transparent panel 4, a backing plate 6 disposed at an incline with respect to the source of solar radiations, and a thin pliable film 8 secured at its top edge 10 to freely overlie backing plate 6. The housing further includes an inlet 12 for inletting a heat-exchange liquid between the backing plate 6 and the pliable film 8 such that the heat-exchange liquid flows downwardly by gravity in the form of a thin uniform layer between the film and the backing plate. An outlet 14 is disposed at the bottom of the collector housing for outletting the heat-exchange liquid after having been heated by the solar radiations. Insulation 16 is applied along the housing side walls 2. Similar insulation 18 closes the back face of the housing, and additional insulation 20 is applied between the insulation back face 18 and the rear face of the backing plate 6.

As pointed out earlier, the thin pliable film 8 freely overlying the backing plate 6 is of a darkened heat-absorbing material. It may be of metal foil, e.g., aluminum foil 30 microns thickness painted black. Or it may be of plastic loaded with conductive particles, e.g. a 32 micron film of "Tedlar" (registered Trademark) loaded with graphite powder. As further alternatives, the film may be a metal foil having an extremely thin plastic layer to prevent the formation of pin holes, or a thin plastic film having a darkened layer for heat-absorption.

In FIG. 4, the backing plate 6 is of sheet metal, e.g., aluminum, formed at its upper end with a loop 22 to define a header 24 communicating with inlet pipe 12. Fasteners 26 secure the bottom of the loop between a pair of bars 28 and 30. The darkened heat-absorbing film 8 is folded around the upper edge of bar 30 and is retained thereon by resilient clips 32. Bar 28 is formed with recesses 33 (FIG. 4a) extending in a vertical direction and spaced transversely of the bar to provide a plurality of openings for the heat-exchange liquid from header 24 to the interface between the darkened heat-absorbing film 8 and the backing plate 6.

Figure 5:
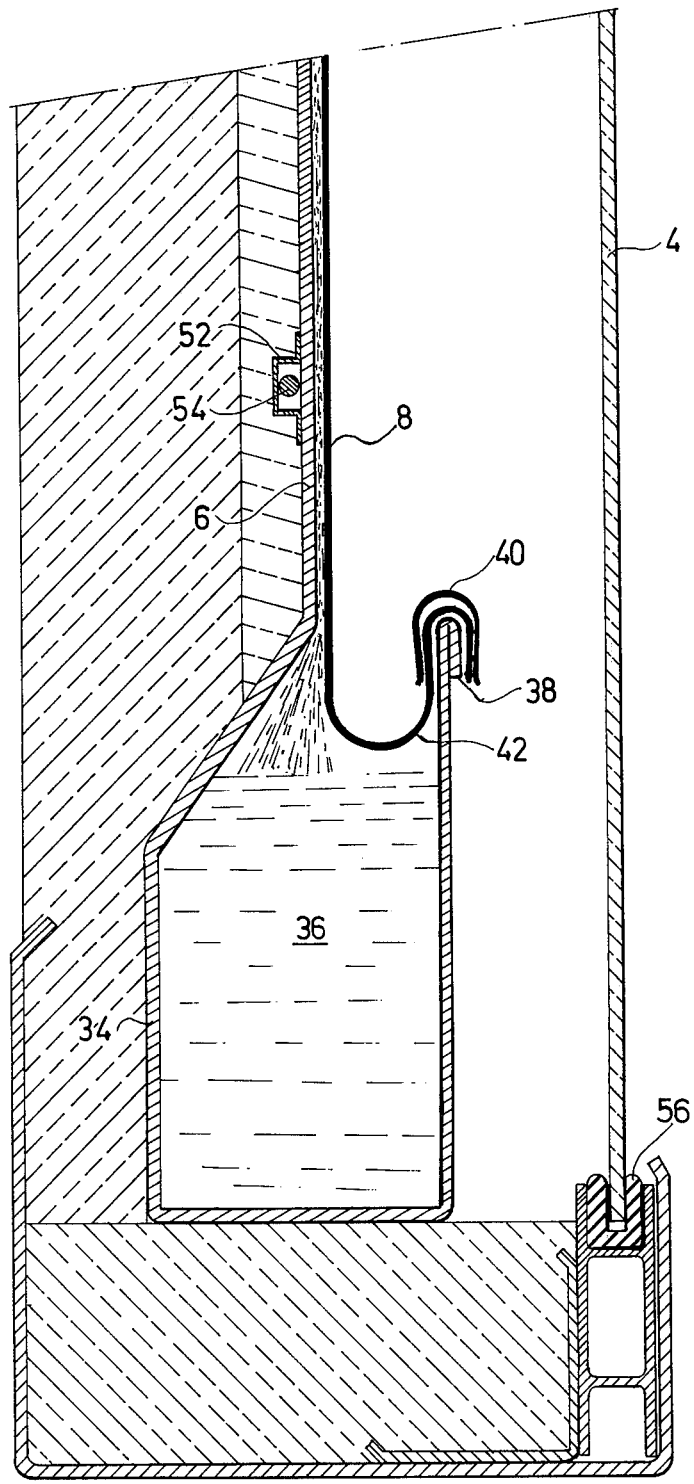
FIG. 5 is a view similar to that of FIG. 4, but of the lower end of the solar collector.

As shown particularly in FIG. 5 the lower end of the backing plate 6 is also formed with a loop extension 34 to define an outlet sump or header 36 communicating with the outlet pipe 14. The free end of the loop extension 34 is formed with a bead 38 to receive the lower edge of the heat-absorbing film 8, the latter being folded over bead 38 and retained in place by resilient clips 40.

Figure 6:
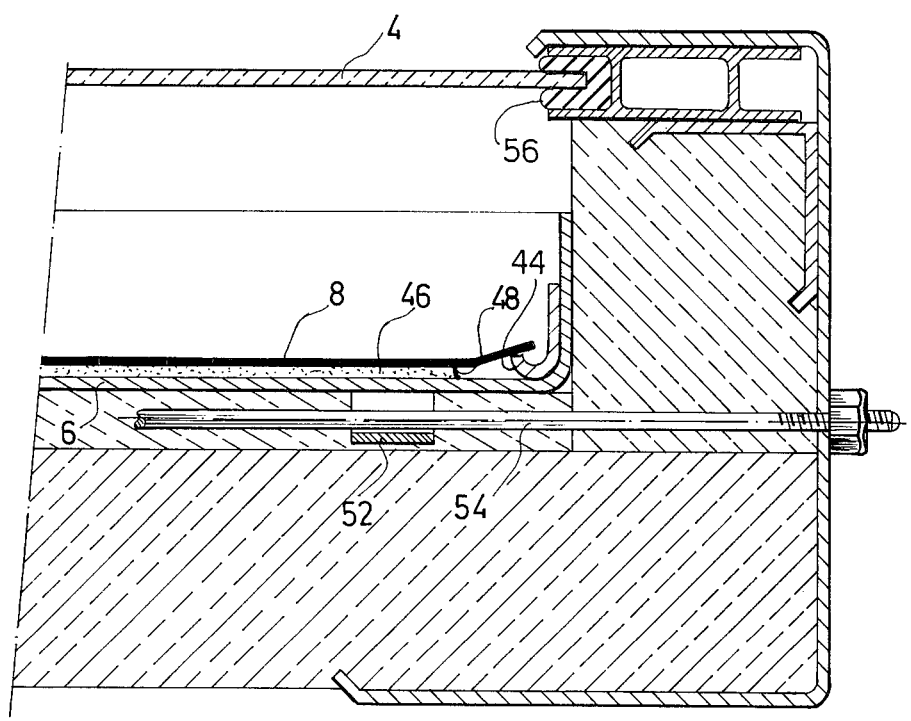
FIG. 6 is an enlarged sectional view along lines VI—VI of FIG. 1.

The darkened heat-absorbing film 8 loosely overlies the planar section of the backing plate 6 for free and unrestrained movement except for the top edge of the film secured by clips 32. For this purpose, the bottom of the film 8 is provided with a slack portion 42 (FIG. 5) between the lower edge of the planar section of the backing plate 6 and the bottom edge of the film secured by the clips 40, to permit the free and unrestrained movement of the film in the vertical direction. FIG. 6 illustrates the arrangement of the film along its side edges to permit free and unrestrained movement of the film in the horizontal direction.

Thus, as shown in FIG. 6, the backing plate 6 is formed with a projection or flange 44 extending uniformly along each side of its planar section and projecting from the plane of that section in the direction of the overlying darkened heat-absorbing film 8. The side edges of the latter film loosely rest on these projections 44 so as to be flexed thereby away from the plane of the backing plate 6. This arrangement permits the sidewise movement of these side edges of the film. In addition, the heat-exchange liquid 46 flowing between the backing plate 6 and the heat-absorbing film 8 forms a meniscus 48 along each side edge which effectively seals the flowing liquid against leakage and also against the entrance of air.

The backing plate 6 is secured within the housing 2 by means of a plurality of channel members 52 fastened to the side of the backing plate opposite to that facing the darkened heat-absorbing film 8, each of the channel members receiving a rod 54 passing through it and through the opposed sidewalls of the collector housing 2. The transparent front panel 4 is secured by means of a sealing ring 56 mounted to the front face of the housing 2.

Insulating members 16 and 18 preferably are expanded polyurethane, and insulation 20 is preferably of light-weight insulation, for example rockwool or glass-wool.

The operation of the device is as follows: The heat-exchange light mineral oil is introduced (e.g. via an external pump) through inlet 12 into header 24 where it flows under pressure through recesses 33 in bar 28 (FIG. 4a) and thenceforth downwardly by gravity as a thin uniform layer between the darkened heat-absorbing film 8 and the backing plate 6. Since film 8 loosely overlies the backing plate 6 and is free and unrestrained for movement with respect thereto except for its secured top edge, and since the oil has good wetting properties with respect to both the film 8 and the backing plate 6, the film 8 will be attracted towards the flowing oil by the surface tension of the latter, thereby assuring the formation of a thin, continuous, bubble-free layer of flowing oil. This flowing layer of oil receives, by conduction, the solar radiations absorbed by the darkened heat-absorbing film 8 and is thereby heated during its passage through the space between the film and the backing plate. The so-heated oil drains into sump 36 and may be removed through the outlet pipe 6 by a pump (not shown) as known in solar heaters.

The solar collector illustrated in FIGS. 7–10 includes a housing 102 closed by a transparent panel 104 facing the source of solar radiations. A backing plate 106 is secured within the housing so as to be disposed at an incline with respect to a source of solar radiations, and thin, darkened heat-absorbing pliable film 108 is secured at its top edge to freely overlie backing plate 106. The housing further includes an inlet 112 for inletting an oil between the backing plate 106 and the darkened, heat-absorbing pliable film 108, such that the oil flows downwardly by gravity in the form of a thin uniform layer between the film and the backing plate. An outlet 114 is disposed at the bottom of the collector housing for outletting the oil after having been heated by the solar radiations. The housing further includes insulation 116 at its underside to minimize the loss of heat absorbed by the oil.

In the solar collector of FIGS. 7–10, the backing plate 106, instead of being of sheet metal as in FIGS. 1–6, is of plastic, preferably resin-impregnated fiberglass. It is formed at one end, constituting the top end of the housing, with a recess 160 (FIG. 8) extending transversely across the backing plate. The inlet opening 112 passes through recess 160. The heat-exchange oil inletted through opening 112 is thus distributed transversely across the top end of the backing plate by the passageway defined by recess 160.

The plastic backing plate 106 is further formed at its bottom end with a second transverse recess 162 through which passes the outlet 114 for the oil. In addition, the plastic backing plate 106 is formed with integral sidewalls 164 defining the sidewalls of the solar collector housing, and with an integral bottom wall 166 defining the bottom wall of the housing. The transplant panel 104 may be removably secured to the housing in an suitable manner, such as by fasteners 168 passing through an outturned rim 169 (FIG. 8) formed around the periphery of the panel, and a flat rim 170 integrally formed with the plastic backing plate 106 inwardly of its sidewalls 164.

As shown particularly in FIG. 8, a plastic distributor panel 172 overlies recess 160 at the inlet end of the plastic backing plate 106. Distributor panel 172 is bonded to the plastic backing plate 106 so as to cover recess 160 and to be substantially flush with the plastic backing plate 106. Just above the inlet recess 160, the plastic backing plate 106 is formed with a groove 174 (FIG. 8a) adapted to receive a resilient retainer strip 176, as of rubber, for frictionally retaining the upper edge of the darkened heat-absorbing pliable film 108 in place to overlie distributor panel 172 and plastic backing plate 106.

Distributor panel 172 is formed with a plurality of apertures 178 which may strengthened by grommets 180 (FIG. 8b). These apertures are spaced transversely across panel 172 and thereby distribute the heat-exchange oil, entering inlet 112 and recess 160, along the top edge of the darkened heat-absorbing film 108, so that the oil may freely pass first between the film and distributor panel 172, and then between the film and plastic backing plate 106.

A plastic collecor panel 182 overlies the transverse recess 162 formed at the bottom end of plastic backing panel 106, which recess serves as a collector of the heat-exchange fluid before it exists via outlet 114. Collector panel 182 is secured along its bottom edge to a flat shoulder 184 formed at the bottom end of backing plate 106, with the opposite edge 186 of the collector panel being spaced above backing plate 106 as shown in FIG. 9. The bottom end of the darkened heat-absorbing film 108 includes a slack portion 142 and is secured along the free edge 186 of collector panel 182 by the use of clips 140.

Plastic backing plate 106 is also formed with a rib or projection 190 (FIGS. 10, 10a) extending uniformly along each of its two side edges. The side edges of the darkened heat-absorbing film 108 loosely rest on ribs 190 and are flexed thereby away from the plane of the backing plate 106. As described above with respect to FIGS. 1–6, this arrangement permits the sidewise movement of these side edges of the film during use, and in addition produces a meniscus 148 (FIG. 10a) along each side edge which effectively seals the flowing liquid against leakage and the entrance of air.

The operation of the solar collector illustrated in FIGS. 7–10 is basically the same as described above with respect to FIGS. 1–6. Thus, the heat-exchange mineral oil is introduced into inlet 112 whereby it is distributed by recess 160 and the distributor openings 178 in distributor panel 172 first to the space between the darkened heat-absorbing film 108 and panel 172, and then between the film and the plastic backing plate 106. Since the heat-absorbing film 108 loosely overlies the backing plate 106 and is free and unrestrained for movement with respect thereto except for its top edge secured by the resilient strip 176 (FIG. 9a), the film 108 will be attracted by surface tension to the heat-exchange liquid flowing downwardly by gravity, thereby assuring the formation of a thin, continuous, bubble-free layer of flowing heat-exchange liquid. The solar radiations are absorbed by the darked heat-absorbing film 108 and heat the oil which eventually drains into the bottom recess 162 and exits via outlet 114.

If desired, the darkened heat-absorbing film 108 (or film 8 in FIGS. 1–6) may be coated with a thin coating of black paint having a high degree of selectivity for absorbing the radiations of short wavelength (e.g. two microns), and reflecting the radiations of larger wavelength (e.g. ten microns).

FIG. 11 illustrates a modification in the construction in order to strengthen the outer transparent panel if of plastic. The fragement shown in FIG. 11 corresponds to the lower end of the housing illustrated in FIG. 9 to which the collector panel, 282, is secured, wherein it will be seen that the transparent panel 204 is formed around its periphery with side extensions 205 engaging the side walls 264 of the housing. The latter side walls are preferably, formed integrally with the plastic backing plate 206, and their upper ends are preferably stepped inwardly so as to permit the side extensions 205 to be received in substantially a flush fit.

What is claimed is:

1. A solar collector including a housing containing an inlet, an outlet, a backing plate to be disposed during use at an incline with respect to a source of solar radiations, and a film secured at one edge, constituting its top edge during use, to freely overlie said backing plate, said inlet being at one end, constituting the top end during use, of the housing for inletting a heat-exchange liquid between the backing plate and the overlying film such that during use the heat-exchange liquid flows downwardly by gravity in the form of a thin uniform layer between the film and the backing plate; characterized in that said film is a darkened heat-absorbing pliable film having high heat-absorption and low heat-resistivity properties, and that is lies loosely over the backing plate in direct contact therewith with the side edges of the film unsecured for free and unrestrained movement on the backing plate, and further, in that said backing plate is substantially planar and includes a projection extending uniformly along each side edge thereof projecting from the plane of the backing plate in the direction of the overlying darkened heat-absorbing film, the side edges of said film loosely resting on said projections so as to be flexed thereby away from the plane of the backing plate, thereby permitting the free and unrestrained sidewise movement of said film side edges and at the same time producing a meniscus in the heat-exchange liquid flowing along the side edges between said darkened heat-absorbing film and said backing plate effectively sealing said side edges against leakage of the liquid and entrance of air.

2. A solar collector according to claim 1, wherein the bottom edge of the darkened heat-absorbing film is secured within the housing but includes a slack portion immediately below the bottom edge of the backing plate to permit its free and unrestrained movement with respect thereto.

3. A solar collector according to claim 1 wherein said heat-exchange liquid is a mineral oil having good wetting properties, a flash point substantially higher than 100° C., and substantially non-corrosive properties to either the backing plate or to the darkened heat-absorbing film.

4. A solar collector according to claim 1 wherein said darkened heat-absorbing film is a metal foil.

5. A solar collector according to claim 1 wherein said darkened heat-absorbing film is of plastic loaded with carbon particles.

6. A solar collector according to claim 1 wherein said backing plate is of metal.

7. A solar collector according to claim 1 wherein said backing plate is of plastic and is formed with an opening therethrough at one end thereof defining said inlet for the heat-exchange liquid, an opening at the opposite end thereof defining said outlet for the heat-exchange liquid, and a rib extending uniformly along each side edge thereof defining a projection on which the side edges of said darkened heat-absorbing pliable film freely rest.

8. A solar collector according to claim 7, wherein said plastic backing plate is formed with a transverse recess through which said inlet opening extends, said recess defining a passageway for distributing the inletted heat-exchange liquid transversely of said plastic backing plate, the collector further including a plastic distributor panel overlying said recess substantially flush with said plastic backing plate and underlying the top edge of the darkened heat-absorbing film, said plastic distributor panel being formed with a plurality of apertures therethrough for distributing the heat-exchange liquid along said top edge of the darkened heat-absorbing film between same and the plastic backing plate.

9. A solar collector according to claim 8, wherein said plastic backing plate is formed with a second transverse recess through which said outlet opening extends for collecting the heat-exchange liquid leaving the space between the darkened heat-absorbing film and the plastic backing plate, and directing same to said outlet opening.

* * * * *